DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 416

T901,022

PROCESS FOR FOAMING AND GELLING HYDROXYLATED POLYMERIC MATERIAL

Bernard C. Lawes, Wilmington, Del., assignor to E. I. du Pont de Nemours and Company, Wilmington, Del.

Continuation of application Ser. No. 846,619, July 31, 1969, which is a continuation of application Ser. No. 509,620, Nov. 24, 1965. This application Aug. 16, 1971, Ser. No. 172,275

Int. Cl. C08f *29/26, 47/08*

U.S. Cl. 260—2.5 L

No Drawing. 16 Pages Specification

The method of producing a gelled hydroxylated polymer foam, such as polyvinyl alcohol foam, which will adhere to vertical and overhead structures which comprises preparing an aqueous solution containing 1 to 15 percent by weight of hydroxylated polymer and 0.1 to 1.5 percent by weight of a water-soluble gelling agent precursor, such as potassium titanium oxalate or ferric chloride, and having a pH of not more than 5, mixing said solution with air in a foam generator thereby foaming said mixture, and contacting the resulting foam, at a point adjacent to the point at which the foam issues from the foam generator, with an alkaline pH modifying agent, such as ammonia or ammonium hydroxide, for example by injecting ammonia into the foam, in an amount sufficient to increase the pH of the foam to at least 7, whereby said foam becomes tacky within 2 seconds after contact with said alkaline agent and said foam gels.